United States Patent [19]

Castricum

[11] Patent Number: 5,421,185
[45] Date of Patent: Jun. 6, 1995

[54] APPARATUS FOR CUTTING SHEET MATERIAL INTO CURVED SEGMENTS

[75] Inventor: Wilhelmus P. H. Castricum, Palatine, Ill.

[73] Assignee: Spiro America, Inc., Buffalo Grove, Ill.

[21] Appl. No.: 5,646

[22] Filed: Jan. 19, 1993

[51] Int. Cl.⁶ .................. B21D 43/11; B26D 7/06; B26D 5/22

[52] U.S. Cl. ..................... 72/338; 72/324; 83/428; 83/487; 83/500; 83/409

[58] Field of Search ............ 83/428, 485, 487, 496, 83/500, 353, 76.9, 76.6, 508.2, 409; 72/339, 324, 338

[56] References Cited

U.S. PATENT DOCUMENTS

| | | | |
|---|---|---|---|
| 397,020 | 1/1889 | Noyes | 83/498 |
| 740,730 | 10/1903 | Zeh | 83/428 |
| 1,127,448 | 2/1915 | Jullien | 83/428 |
| 2,736,349 | 2/1956 | Francis | 83/428 |
| 3,272,042 | 9/1966 | Haas | 83/428 |
| 3,477,322 | 11/1969 | Gerber et al. | 83/71 |
| 3,548,697 | 12/1970 | Gerber | 83/428 |
| 4,054,069 | 10/1977 | Coop | 82/57 |
| 4,165,667 | 8/1979 | Brolund | 83/409 |
| 4,475,422 | 10/1984 | Lawson | 83/428 |
| 4,506,577 | 3/1985 | Shinomiya | 83/500 |
| 4,638,701 | 1/1987 | Oberlander | 83/496 |

FOREIGN PATENT DOCUMENTS 431530 12/1948 Italy .................. 83/485

OTHER PUBLICATIONS

SPIRO Bend Segment Cutting Machine, Type BSCM Brochure, Spiro Investment AG and Spiro USA, Inc.

Primary Examiner—Daniel C. Crane
Attorney, Agent, or Firm—Willian Brinks Hofer Gilson & Lione

[57] ABSTRACT

An apparatus and method are provided for cutting a sheet of material into a plurality of segments having curved edges. A sheet of material is placed on a frame having a horizontal support member. A clamping device secures the sheet and a first mechanism moves the clamping device and sheet in an axial direction. A cutting head assembly is provided with a passively rotatable knife adapted to cut the sheet as the sheet moves in an axial direction past the knife. The cutting head assembly is rotatable about a vertical axis and movable in a lateral direction perpendicular to the axial motion of the sheet. A second mechanism moves the cutting head assembly in said lateral direction, and a third mechanism rotates the cutting head assembly. To produce a continuous cutting line, a controller sends a signal to the first, second, and third moving mechanisms which simultaneously moves the corresponding components at a desired rate and distance.

25 Claims, 13 Drawing Sheets

APPARATUS FOR CUTTING SHEET MATERIAL INTO CURVED SEGMENTS

BACKGROUND OF THE INVENTION

The present invention relates generally to the manufacture of elbows for furnace pipe or the like, and more particularly, to an apparatus and method for cutting a sheet of material into a plurality of segments having curved edges.

In order to direct the flow of air or other gas to a desired location, conventional furnace pipe or similar ducts employ elbows for joining straight portions of the pipe. Typically, this pipe is made from a galvanized iron sheet which is closed at a longitudinal seam. In order to produce an elbow, one or more tubular segments must have ends which are cut at an angle relative to the axis of the pipe.

A variety of methods have been utilized for producing elbow segments with beveled ends. For example, one such method is to close the sheet metal to form a tube, mount an elliptical collar around the end of the tube, and revolve a cutter around the tube at the angle formed by the collar. Other devices, such as that disclosed in U.S. Pat. No. 4,054,069 to Coop, rotate and axially oscillate a tube relative to an angularly positioned cutter. Devices such as these which perform the cutting operation after the sheet metal is formed into a pipe tend to be expensive and inaccurate. It is difficult to control the angular positions of the pipe relative to the cutters and also time consuming to mount and cut one segment at a time.

Another method of cutting the ends of the tubular segments is to perform the cut on the sheet metal before it is closed into a tube. To create a closed tube with a beveled end shaped as an ellipse, a cut is made in the sheet metal in the form of a sinusoidal wave. Thus, a desired number of segments can be cut in such a manner, closed to form a tube with the desired beveled ends, and assembled together to form an elbow for joining straight segments of pipe.

One such machine which cuts the sheet metal prior to being formed into a tube has been manufactured and sold by Spiro, Inc. The Spiro machine uses a plurality of caster-like cutters which rotate freely about a vertical axis in response to movement of the sheet metal past the cutters. To make a desired cut, the cutters are moved in a lateral direction as the sheet metal moves in a longitudinal direction. The entire sheet of metal is cut into the desired segments when the sheet makes one pass past the cutters.

Another method of cutting the sheet metal prior to forming it into a tube is to use a plasma-type cutter to burn a cut into the sheet metal. These machines typically move the sheet in an X and Y direction while a flame burns into the metal. Such machines tend to produce elbow segments with rough edges or burrs. When assembling the elbow segments together after closing them into tubular segments, the burrs often bind or otherwise damage the assembly machines. Moreover, plasma-type cutters produce bad fumes and smoke, especially when used to cut galvanized metal.

Other attempts have been made to cut a desired pattern in paper or other thin sheet material. For example, U.S. Pat. No. 3,477,322 to Gerber et al. discloses a cutter head supported for movement above a work supporting surface and controlled in two dimensional movements by an associated automatic controller. A reciprocating tool is rotated about its axis of reciprocation during a cutting process to maintain the cutting edge tangent to the line of cut.

SUMMARY OF THE INVENTION

Briefly stated, the invention is directed to a an apparatus and method for cutting a sheet of material into a plurality of segments having curved edges. A frame has a horizontal support member for slidably receiving a sheet of material thereon. A movable clamping device secures the sheet, and a first mechanism moves the clamping device and sheet in an axial direction. A cutting head assembly is provided with a passively rotatable knife adapted to cut the sheet as the sheet moves in an axial direction past the knife. The cutting head assembly is also rotatable about a vertical axis and movable in a lateral direction perpendicular to the axial motion of the sheet. A second mechanism is provided for moving the cutting head assembly in said lateral direction, and a third mechanism is provided for rotating the cutting head assembly. In addition, a controller sends a signal to the first, second, and third moving mechanisms to move the corresponding components at a rate and distance which produces a continuous curved cutting line.

Preferably, a screw is positioned horizontally across the frame both above and below the plane of the sheet, and a nut is threadably mounted to each screw. The nuts are attached to the cutting head assembly such that simultaneous rotation of the screws in one direction moves the nuts in one axial direction, and simultaneous rotation of the screws in an opposite direction moves the nuts in an opposite axial direction. Thus, the cutting head assembly is sufficiently guided for precise movement in a lateral direction.

The cutting head assembly also preferably includes an upper knife positioned above the plane of the sheet which cooperates with a lower knife positioned below the plane of the sheet. The clamping device is preferably adapted to clamp one edge portion of the sheet so that sheets of various sizes can be securely held by the clamping device and moved by the first moving mechanism. Also, the first moving mechanism is adapted to move the sheet back and forth past the cutting head assembly such that each pass of the sheet produces a single curved cutting line.

In another aspect of the invention, a device is provided for punching a dimple in the longitudinal center of the sheet when half of the sheet has moved past the cutting head assembly. This dimple allows ready identification of the centerline of separate segments when assembled into an elbow joint.

The present invention provides significant advantages over other elbow cutting machines. The rotatable knives make a burr-free cut which produces no smoke, fumes, or other uncomfortable or hazardous results. By providing only one cutting head, costs are greatly reduced because less guiding and motion components are required. The combination of the single cutting head and the clamping means also allows a more precise cut since only one segment is being separated at a time. Thus, one segment is clamped at all times and only one segment is being separated by the cut. As a result, there is less play or variance between the segments which provides a clean, precise cut. In addition, providing a screw and nut arrangement above and below the cutting head assembly provides increased guidance and motion control which further enhances the cut obtained.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
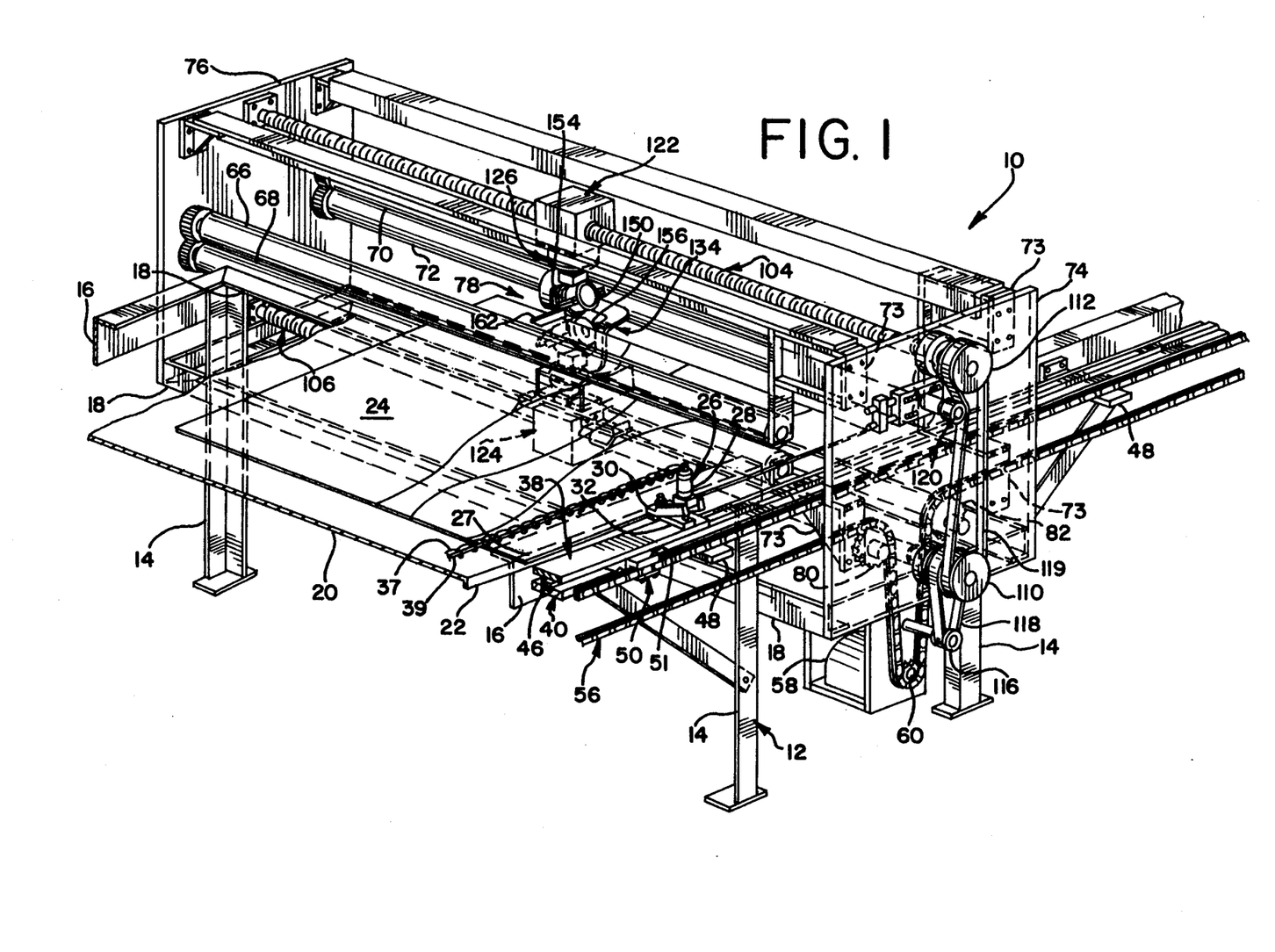
FIG. 1 is a partial perspective view of the present invention.
Figure 2:
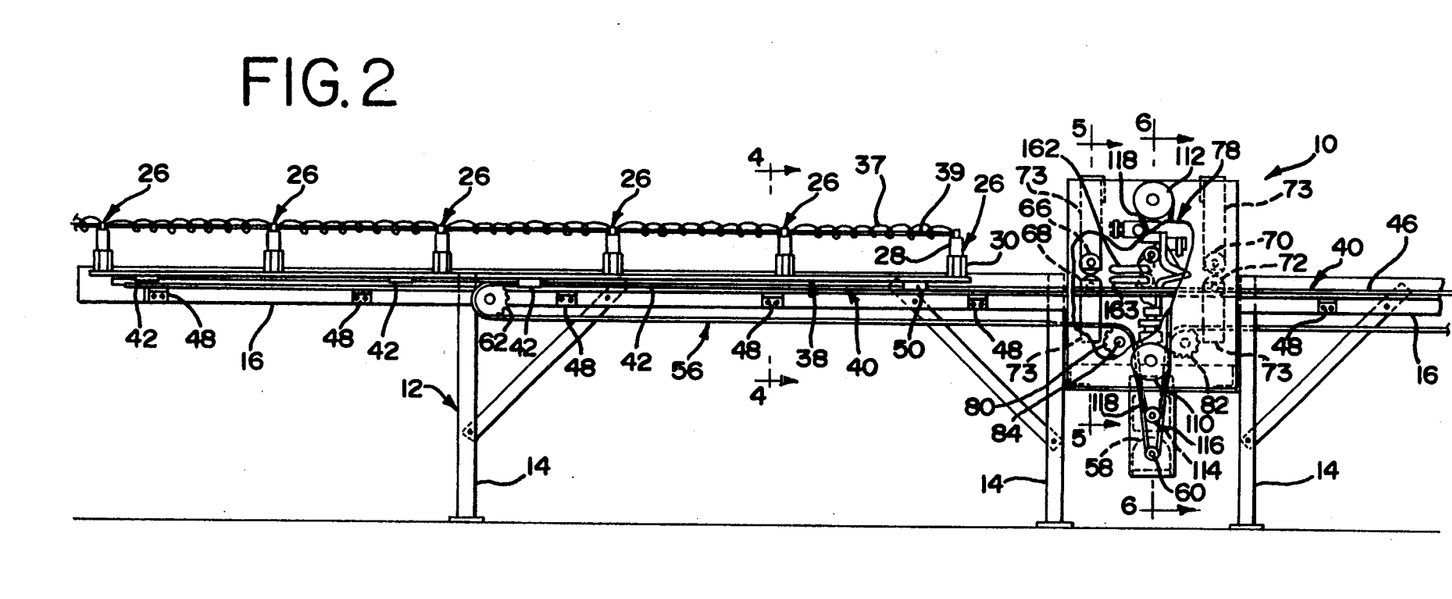
FIG. 2 is a partial side view of the present invention with a portion of a side wall removed.
Figure 3:
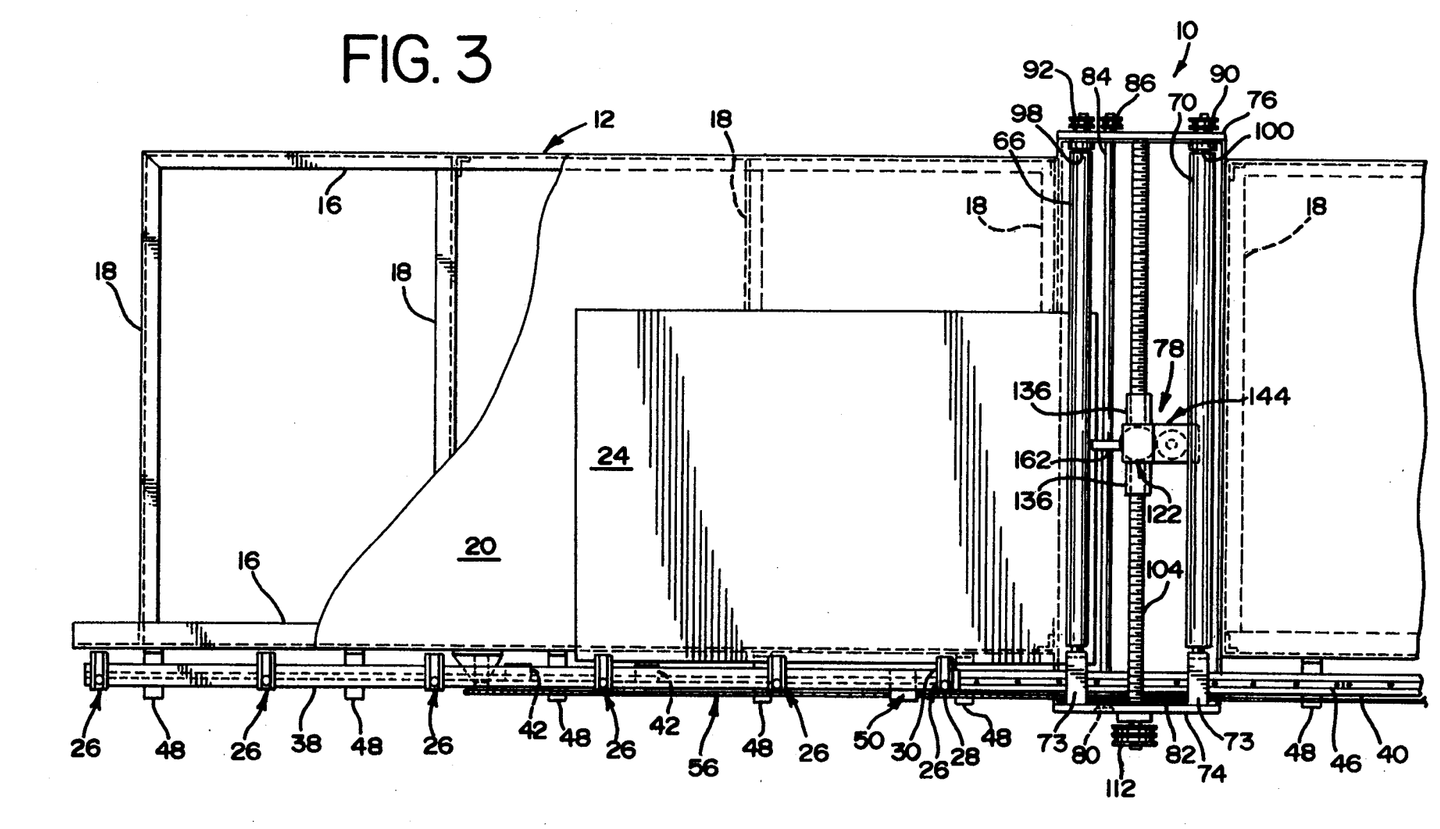
FIG. 3 is a partial top view of the invention with a portion of a support surface removed.

Referring to the drawings, FIGS. 1–3 show a cutting apparatus indicated generally at 10. A frame 12 has a plurality of vertical legs 14, horizontal side members 16 and cross-members 18. The side members 16 and cross-members 18 support a flat horizontal surface 20 which has flanges 22 depending downwardly therefrom. A sheet 24 of material, typically galvanized iron, is slidably placed on the surface 20 for the cutting operation. The frame 12 and surface 20 are preferably large enough to accommodate sheets of various sizes, thus allowing a desired number and size of sections to be cut in order to make different size elbows. As shown in FIG. 1, a plurality of cuts has already been made in the sheet 24.

Figure 4:
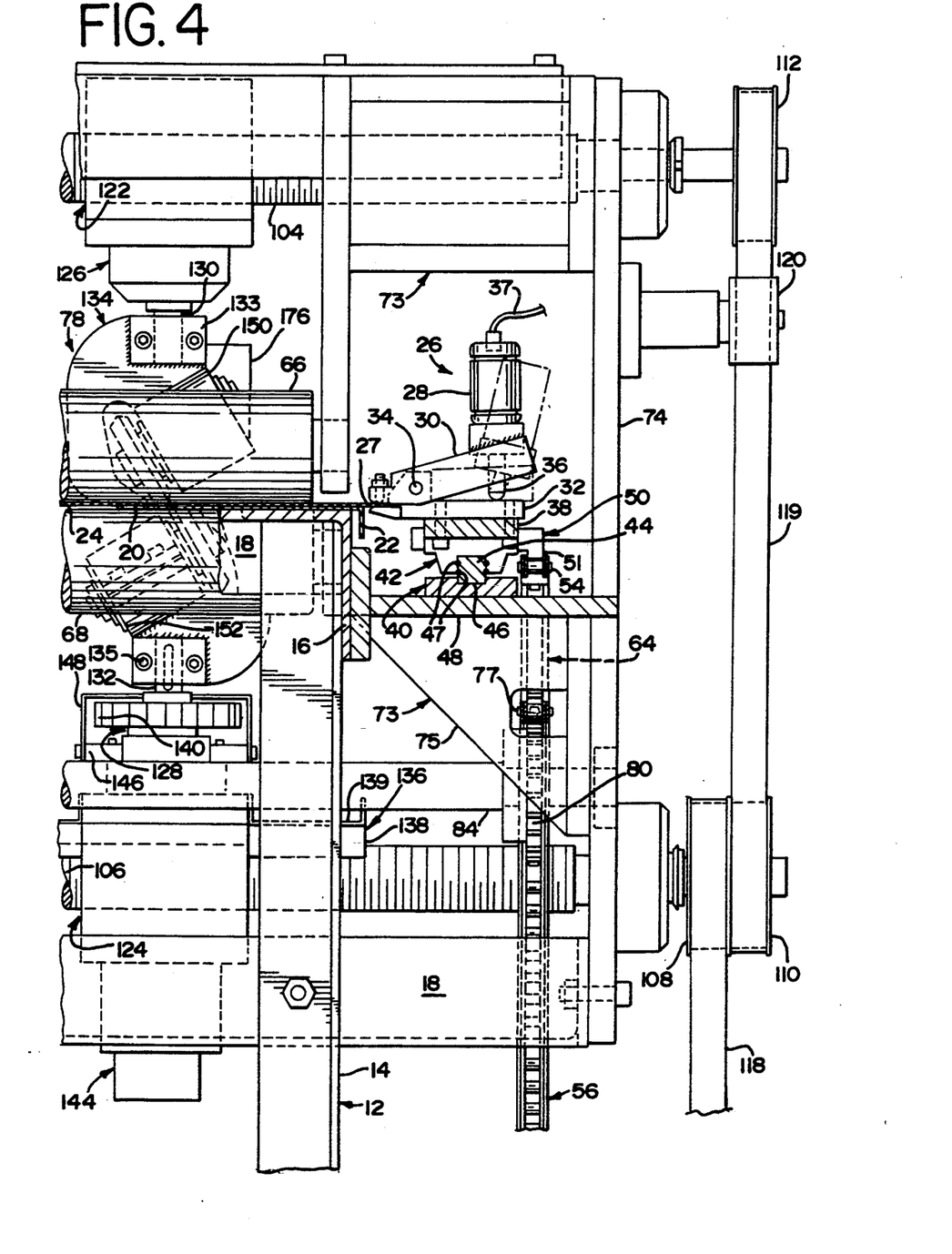
FIG. 4 is a cross-sectional view of the invention taken along the line 4—4 in FIG. 2.
Figure 8:
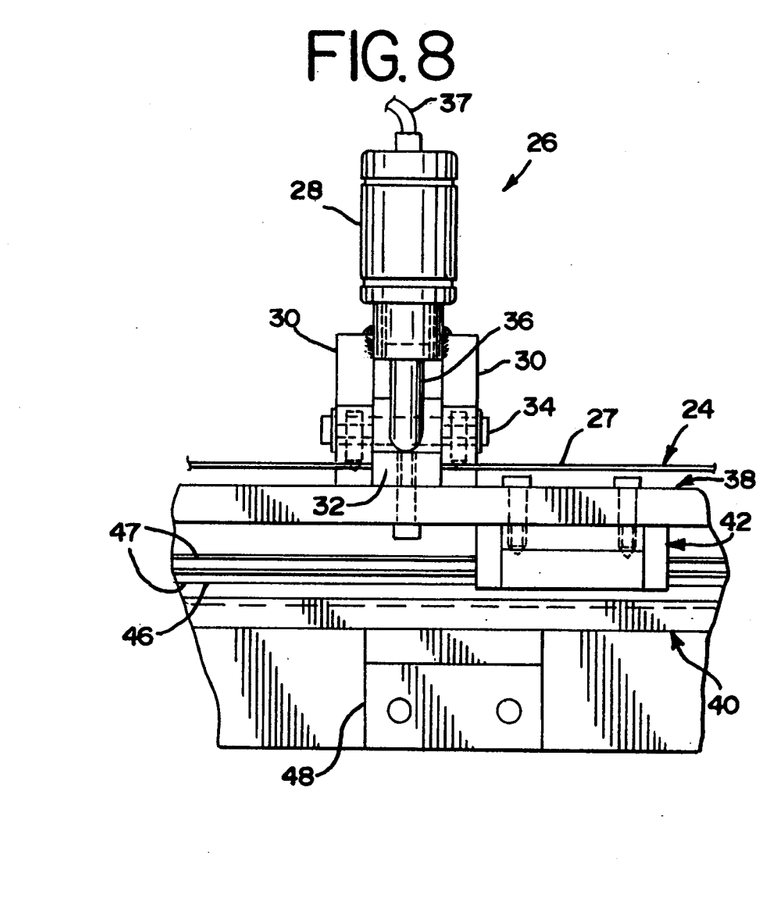
FIG. 8 is an enlarged side view of a slide beating and a clamping device.
Figure 9:
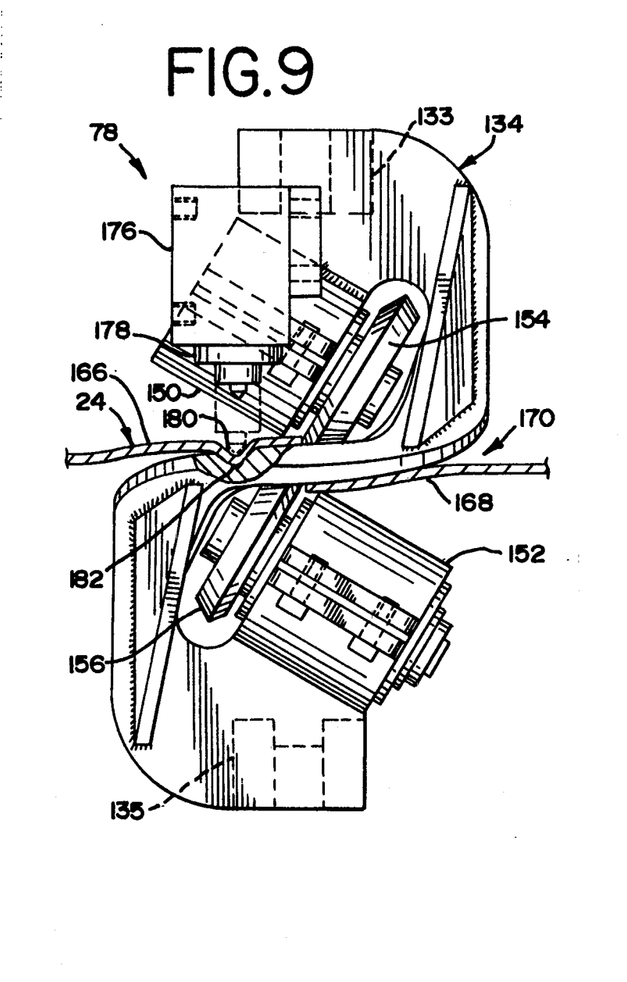
FIG. 9 is a rear view of a cutting head assembly showing a cut sheet in cross-section.
Figure 10:
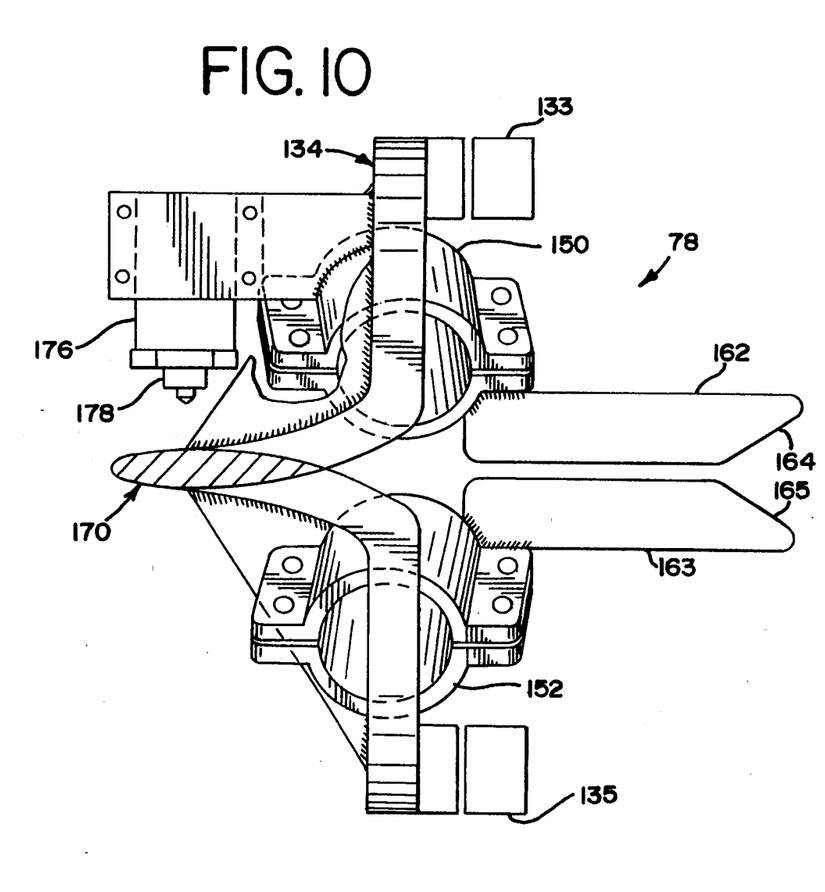
FIG. 10 is a back side view of the cutting head assembly shown with the knives removed for clarity.
Figure 11:
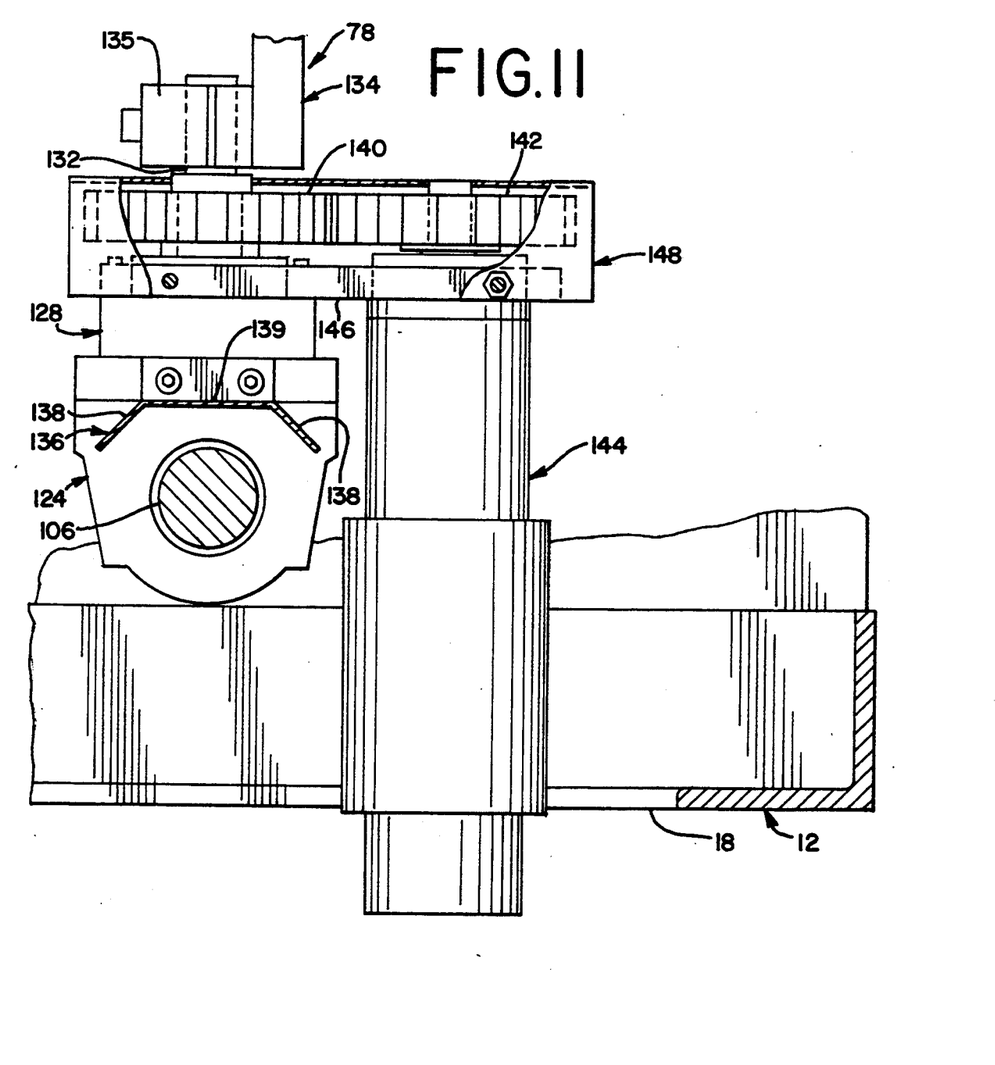
FIG. 11 is a cross-sectional view of a motor and ballscrew and nut assembly taken along the line 11—11 in FIG. 5.

Prior to the cutting operation, the sheet 24 is placed in a predetermined position (not shown) on the surface 20. A plurality of clamping devices 26 are then activated to clamp an edge portion 27 of the sheet 24. As best shown in FIGS. 4 and 8, the clamping devices 26 preferably include a pneumatic cylinder 28 mounted between the ends of spaced apart hinge members 30. The hinge members 30 are pivotally attached to a base member 32 by a pin 34. The pin 34 extends between the hinge members 30 opposite the end where the cylinder 28 is attached. Thus, the hinge members 30 pivot between an open position (shown in broken lines in FIG. 4) in which a rod 36 is withdrawn in the cylinder 28, and a clamped position in which the rod 36 extends outwardly from the cylinder 28. Preferably, the cylinders are supplied with pressurized air from a coil-type air hose 37 which is suspended on a steel wire 39 and passes between the cylinders.

To allow movement of the sheet 24 and clamping devices 26 in an axial direction, the base members 32 of the clamping devices 26 are mounted to a clamping bar 38 which extends longitudinally along the side members 16 of the frame 12. The clamping bar 38 is slidably attached to a guide rail 40 by a plurality of spaced apart, linear slide beatings 42, preferably THK Model No. HSR 20TA. As best shown in FIGS. 4 and 8, an upper portion of each slide bearing 42 is mounted to the clamping bar 38 by conventional fasteners such as bolts or the like. A channel 44 is formed in a lower portion of each slide bearing 42 for sliding movement along a track 46 which extends upwardly from the guide rail 40. Preferably, a pair of longitudinal grooves 47 are formed in each side of the track 46 for retaining a plurality of ball slides. To provide a continuous guide throughout the cuffing operation, the guide rail 40 spans substantially the entire length of the frame 12. The guide rail 40 is fixedly mounted to a plurality of support brackets 48 which extend outwardly from the side members 16 of the frame 12.

Figure 7:
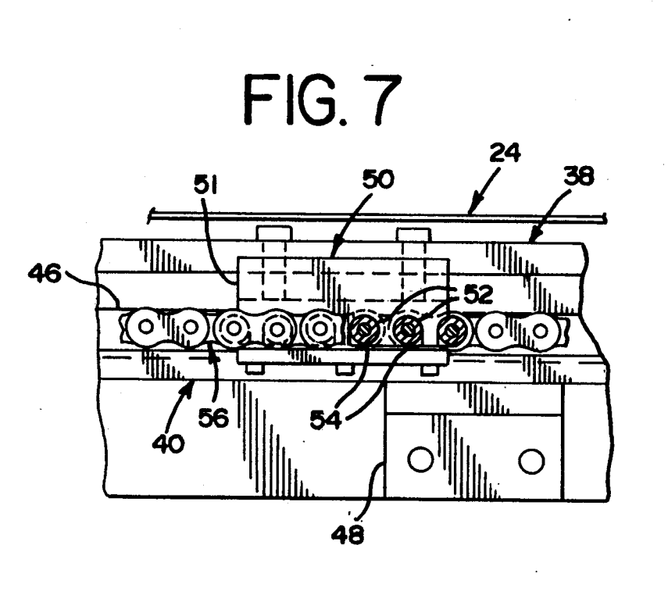
FIG. 7 is an enlarged side view of a chain sprocket.

To move the clamping bar 38 in an axial direction, a chain holder 50 is fixedly mounted to the clamping bar 38. As best shown in FIGS. 1, 4 and 7, the chain holder 50 includes an arm 51 extending outwardly and downwardly from between the bar 38 and rail 40. A plurality of sockets 52 are formed in the arm 51 for receiving the links 54 of a chain 56. The chain 56 is driven by a motor 58 and drive sprocket 60, and meshes with two end sprockets 62 and 64 which are rotatably attached to the side member 16 of the frame 12. Thus, the motor 58 drives the chain 56 in one direction to move the clamping bar 38 and sheet 24 in a corresponding axial direction, and in another direction to move the clamping bar 38 and sheet 24 in an opposite axial direction.

Figure 5:
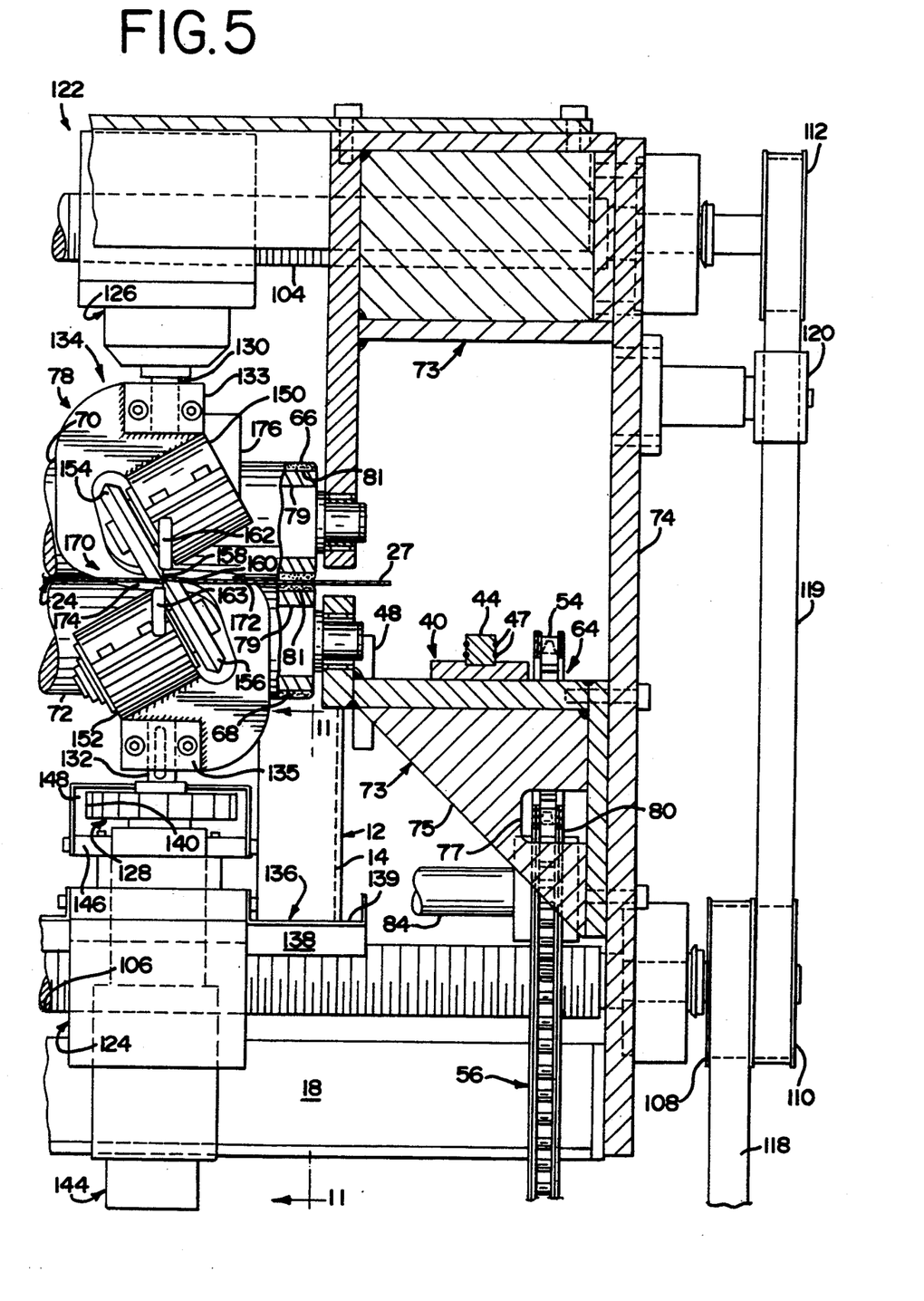
FIG. 5 is a cross-sectional view of the invention taken along the line 5—5 in FIG. 2.
Figure 6:
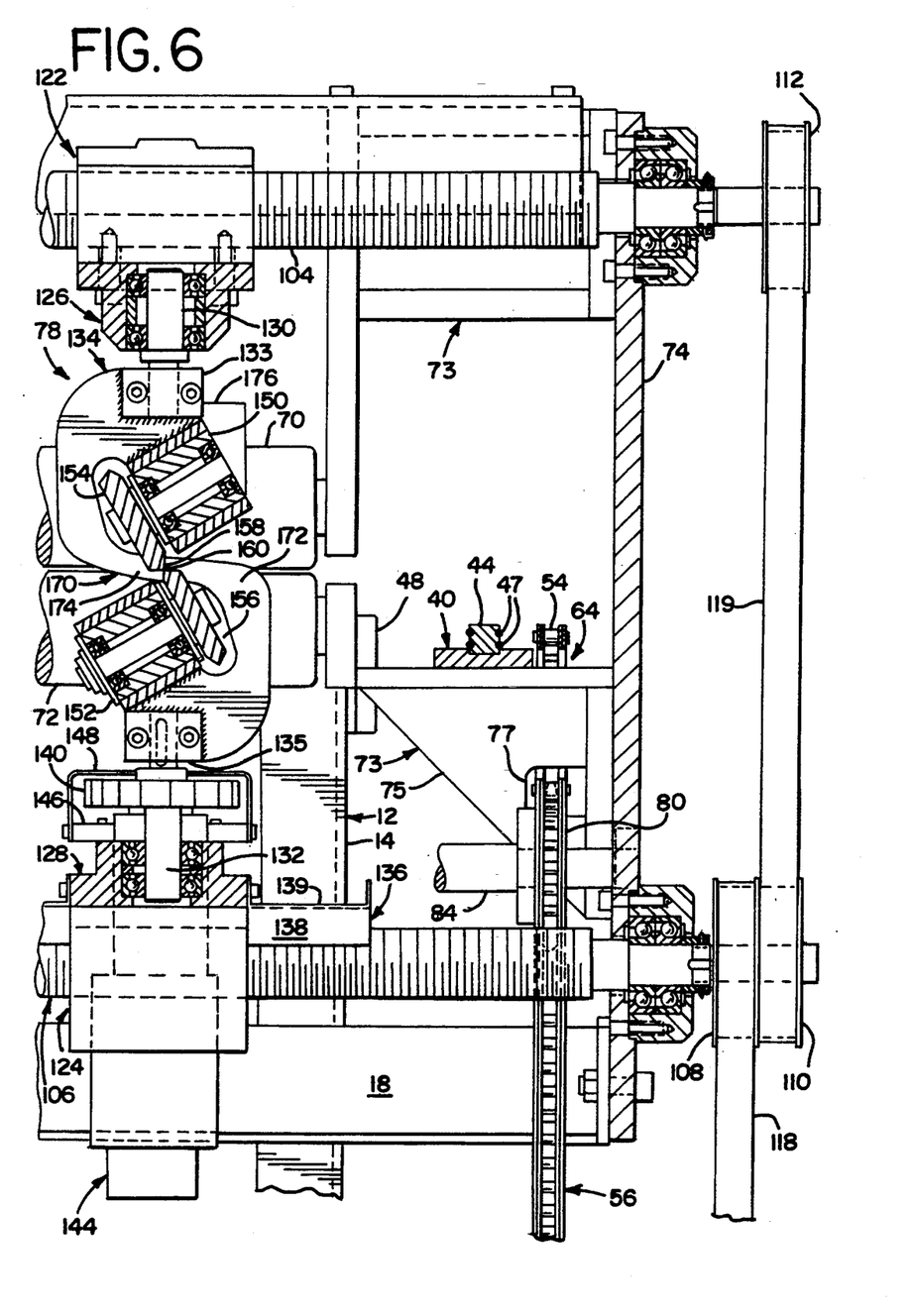
FIG. 6 is a cross-sectional view of the invention taken along the line 6—6 in FIG. 2.

Preferably, the sheet 24 is also guided and driven at the same rate by two pairs of feed rollers 66, 68 and 70, 72. The pairs of rollers 66, 68 and 70, 72 are rotatably attached to side walls 74 and 76 of the frame 12 and extend laterally across the frame 12. The pair 66, 68 is positioned in vertical alignment in front of a cutting head assembly 78, and the pair 70, 72 is positioned in vertical alignment behind the cutting head assembly 78. To provide a mounting surface for the rollers while allowing the chain 56, clamping bar 38 and clamping devices 26 to move past the rollers, a plurality of bracket assemblies 73 extend inwardly from side wall 74. As best shown in FIGS. 4–6, the lower brackets 73 include a vertical support plate 75 having an aperture 77 therein to allow the chain 56 to pass therethrough. Preferably, the rollers 66, 68, 70 and 72 include an inner metal core 79 and a polyurethane sleeve 81 to grip and move the sheet 24.

Figure 12:
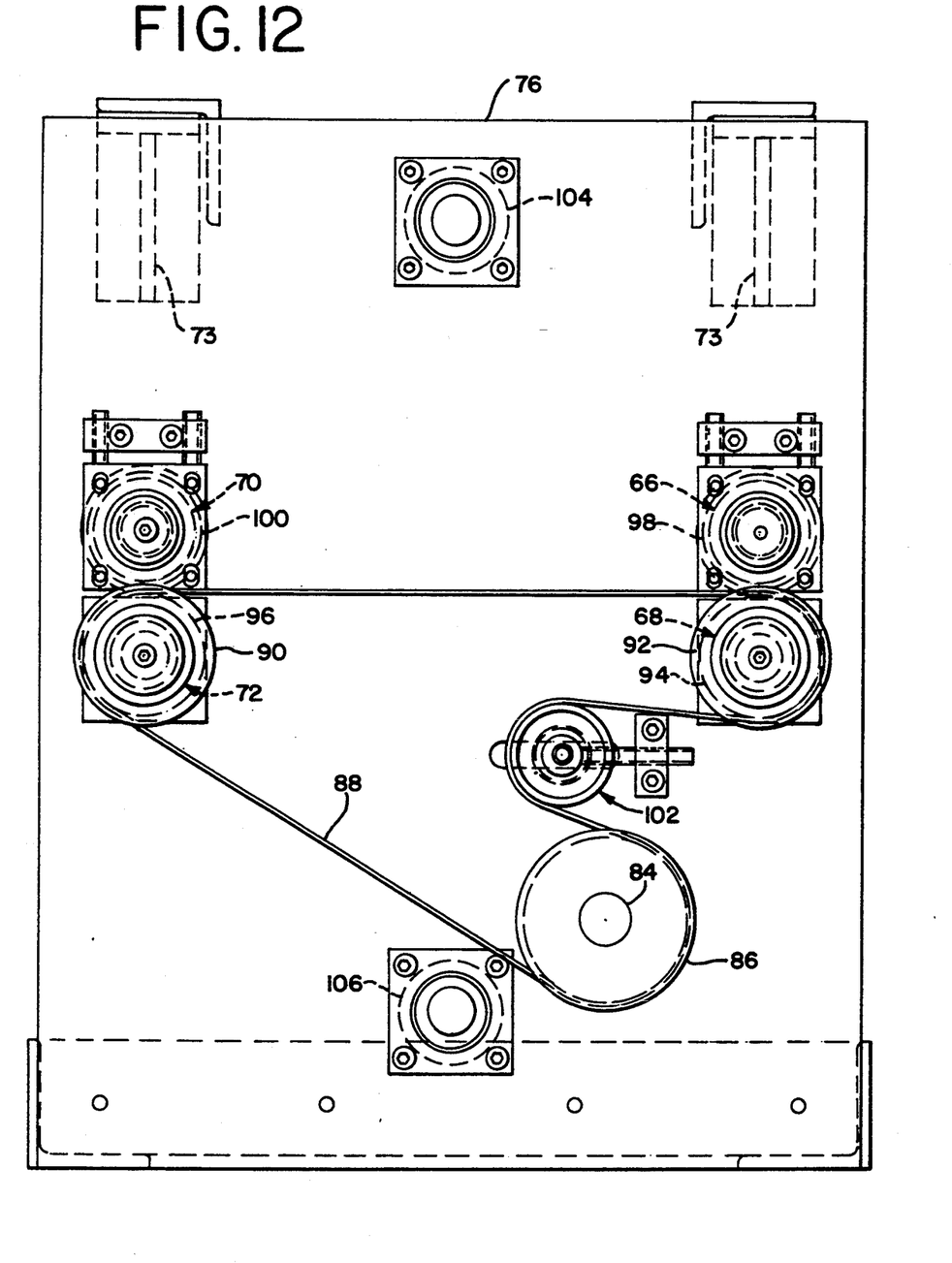
FIG. 12 is a back side view of the invention showing the mounting of various shafts.
Figure 13:
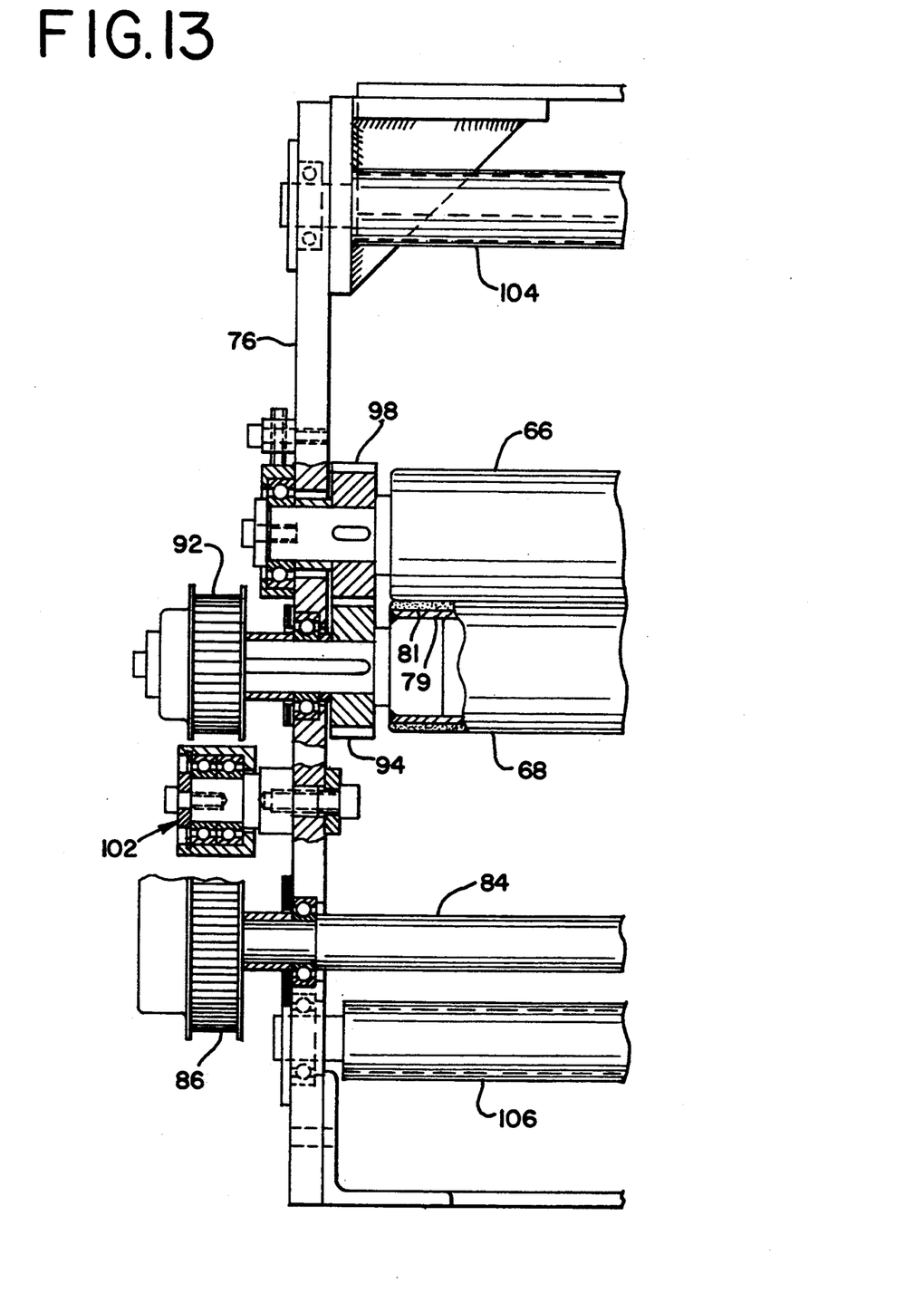
FIG. 13 is front view, partially in cross-section, of the shaft mounting shown in FIG. 12.

To drive the rollers 66, 68, 70 and 72 at the same rate as the clamping bar 38, a pair of sprockets 80 and 82 are rotatably attached to side wall 74 and mesh with the chain 56. The sprocket 80 is mounted to the end of a transmission shaft 84 which extends across the frame 12 and through the side wall 76. As illustrated in FIGS. 3, 12 and 13, a pulley 86 is attached to an end of the shaft 84 and cooperates with a belt 88 to rotate pulleys 90 and 92 which are mounted to ends of the lower rollers 68 and 72. To drive the upper rollers 66 and 70, the lower rollers 68 and 72 have gears 94 and 96 mounted thereto in intermeshing relation with gears 98 and 100 mounted to the upper rollers 66 and 70. In addition, a tensioning pulley 102 is provided to allow adjustment of the belt tension. The feed rollers 66, 68, 70 and 72 can also be passively rotatable to function primarily as a guide rather than a drive mechanism. In addition, a safety guide (not shown) can extend across the frame 12 adjacent both pairs of rollers to prevent the fingers of an operator from accidentally getting caught between the rollers of a pair.

To guide and move the cutting head assembly 78 in a lateral direction perpendicular to the axial motion of the sheet 24, upper and lower screws 104 and 106 extend horizontally between the side walls 74 and 76. The upper and lower screws 104 and 106 are rotatably attached to the side walls 74 and 76. The lower screw 106 includes an inner pulley 108 and an outer pulley 110, and the upper screw 104 includes a single pulley 112. To rotate the screws 104 and 106, a drive motor 114 (FIG. 2) rotates a drive shaft and pulley 116, which cooperates with a belt 118 to rotate the inner pulley 108 on the lower screw 106. This in turn causes rotation of the outer pulley 110, which cooperates with a belt 119 to rotate the pulley 112 on the upper screw 104. Thus, both screws 104 and 106 are rotated in the same direction and at the same rate as the drive shaft and pulley 116 of the motor 114. In addition, the tension in the belt 119 can be adjusted by a tensioning pulley 120 which extends outwardly from the side wall 74.

To translate the rotation of the screws 104 and 106 into axial movement of the cutting head assembly 78, an upper nut 122 is threadably attached to the upper screw 104, and a lower nut 124 is threadably attached to the lower screw 106. As best shown in FIG. 6, an upper bearing holder 126 is attached to the upper nut 122, and a lower bearing holder 128 is attached to the lower nut 124. The upper and lower bearing holders 126 and 128 rotatably hold locating shafts 130 and 132 which extend vertically toward each other. The locating shafts 130 and 132 are securely held by damping members 133 and 135 on a cutter head 134 of the cutting head assembly 78. Thus, as the screws 104 and 106 are rotated in a desired direction, the nuts 122 and 124, the bearing holders 126 and 128, and the cutting head assembly 78 move in a corresponding axial direction perpendicular to the motion of the sheet 24.

Preferably, a pair of screw coverings 136 are provided to prevent shavings of metal from failing onto the lower screw 106. The screw coverings 136 are mounted to the sides of the lower bearing holder 128 and extend laterally outward over the screw 106. To allow shavings to slide onto a floor, the coverings 136 have side sections 138 which slope downwardly from a center section 139.

As best shown in FIGS. 4–6 and 11, a gear 140 is attached to the locating shaft 132 to allow rotation of the cutter head 134. The gear 140 meshes with a drive gear 142 on a motor 144, which is attached to the lower bearing holder 128 by a bracket 146. Thus, the motor 144 moves axially with the lower nut 124 and bearing holder 128, while simultaneously rotating the cutter head 134 at a desired rate. Preferably, a gear covering 148 is also provided to prevent metal shavings from failing onto the gears 140 and 142. To provide power and electrical signals to the motor 144, a looped cable (not shown) hangs on a steel wire and moves back and forth with the motor 144.

The cutter head 134 is preferably S-shaped with the clamping members 133 and 135 located at a top and bottom portion thereof. Assembly and disassembly of the cutter head 134 to the beating holders 126 and 128 is easily accomplished by tightening conventional fasteners to clamp the clamping members 133 and 135 around the locating shafts 130 and 132. A pair of cylindrical knife holders 150 and 152 are positioned between the clamping members 133 and 135 so that the plane of the sheet 24 passes between the knife holders 150 and 152. An upper knife 154 is rotatably attached to the knife holder 150, and a lower knife 156 is rotatably attached to the knife holder 152. The knives 154 and 156, which are passively rotatable, have cutting edges 158 and 160 which overlap to cut the sheet 24 as it passes between the knives. Preferably, the axes of the knife holders 150, 152 and knives 154, 156 are at approximately a 30° angle from the plane of the sheet 24 to allow the knives to swivel through the sheet as they are rotated and moved laterally while the sheet 24 moves longitudinally. To ensure coordinated rotation of each knife about the vertical axis, the locating shafts 130 and 132 are preferably in alignment with the cutting point of the knives 154 and 156, i.e. the point where the knives overlap.

To guide the sheet 24 between the overlapping knives 154 and 156, a pair of spaced apart guide members 162 and 163 with beveled ends 164 and 165 extend outwardly from the cutter head 134. To route severed portions 166 and 168 of the sheet 24 (FIG. 9) past the cutter head 134 after a cut has been made, a middle portion 170 of the cutter head 134 has an upwardly sloping face 172 and a downwardly sloping face 174. As best shown in FIGS. 4–6 and 9, the upwardly sloping face 172 causes the severed portion 166 to pass over the middle portion 170 and the downwardly sloping face 174 causes the severed portion 168 to pass underneath the middle portion 170 of the cutter head 134. The severed portions 166 and 168 then return to the same plane as they pass through the rollers 66 and 68 or 70 and 72, depending on which rollers are the exit rollers and which ones are the entry rollers.

Figure 17:
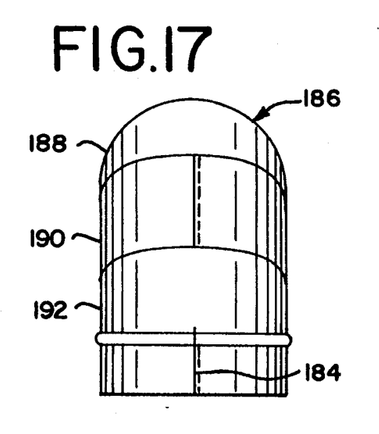
FIG. 17 is a front view of an assembled elbow.
Figure 18:
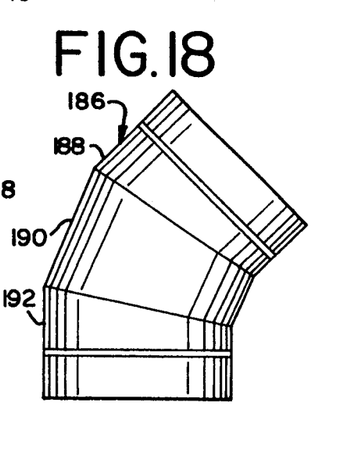
FIG. 18 is a side view of the elbow in FIG. 17.

Referring again to FIG. 9, a pneumatic cylinder 176 is attached to an upper portion of the cutter head 134. The axis of the cylinder 176 is vertical and spaced apart from the cutting point of the knives 156 and 158. When one half of the sheet 24 has moved past the knives 156 and 158, a punch 178 extends outwardly from the cylinder 176 with a sufficient force to produce a dimple 180 in the longitudinal center of the sheet 24. Preferably, a notch 182 is formed in the middle section 170 of the cutter head 134 underlying the punch 178 to allow deformation of the sheet 24. As shown in FIGS. 17 and 18, the dimple 180 designates the centerline 184 of a section which allows an assembler to easily and accurately align separate segments when joining them to form an elbow 186.

In operation of the cutting apparatus 10, an operator inputs into a controller (not shown) the desired size of the elbow to be made. More particularly, the operator inputs the desired number of segments, the diameter and the bend radius of the elbow. The controller then calculates the required size of the sheet 24. The length of the sheet 24 corresponds to the required period of a sine wave and the width is determined by the amplitude of the sine wave. The sheet 24 is placed on the support surface 20 at a predesignated home position, and a foot pedal or other manual actuator (not shown) initiates the clamping devices 26 to securely clamp the sheet 24. The controller is then activated to initiate the motor 58 and chain 56 to advance the clamping bar 38 and sheet 24 toward the cutting head assembly 78. The controller determines when the sheet 24 reaches the cutting head assembly 78 based on the home position of the sheet 24, its size, and the speed at which it is traveling. In addition, an encoder on the motor 58 (not shown) sends pulses to the controller corresponding to the revolutions of the drive shaft to monitor the rate at which the motor 8 is operating.

When the sheet 24 makes contact with the knives 154 and 156, the controller sends a signal to the drive chain motor 58, the ball screw motor 114, and the motor 144 for rotating the cutter head 134. The signals sent by the controller cause the motors to move their connected components at a rate and an amount which produces a cutting line defined by a sine wave. In other words, the cutter head 134 is rotated and moved laterally and the sheet 24 is moved longitudinally at a rate which corresponds to a sine wave cut. The motors 114 and 144 also have encoders mounted thereon (not shown) which send feedback signals to the controller to allow the controller to make the necessary adjustments to maintain the sine wave pattern based upon the input data. Preferably, the controller is a standard personal computer modified to include a motion control board Model No. BMC 1000 manufactured by Galil, Inc.

Figure 14:
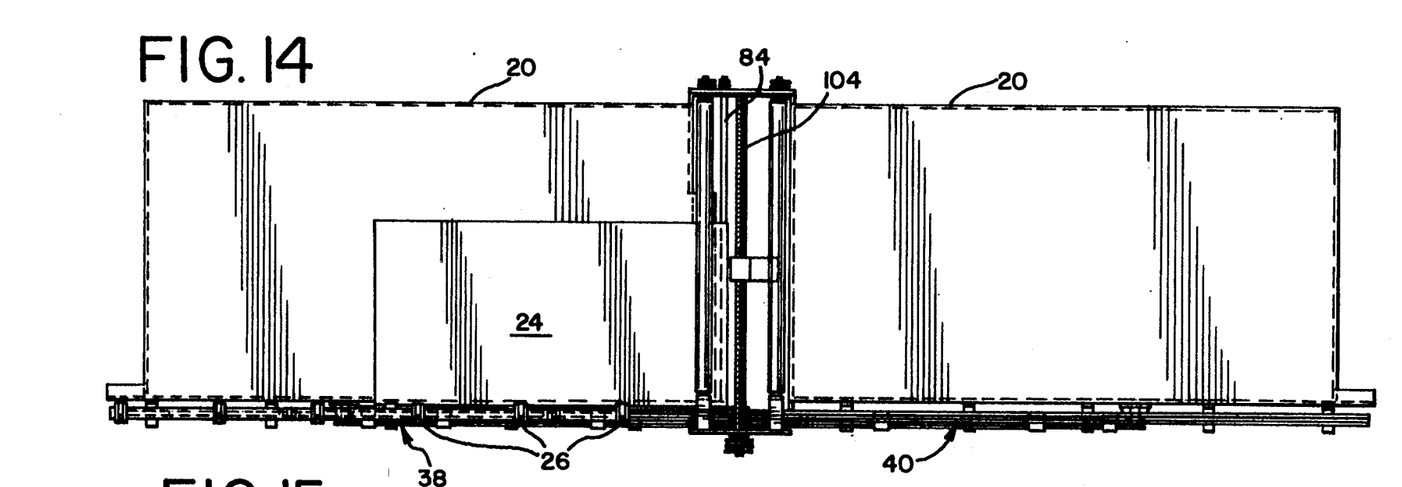
FIG. 14 is a top view of the invention showing a sheet of material prior to being cut.
Figure 15:
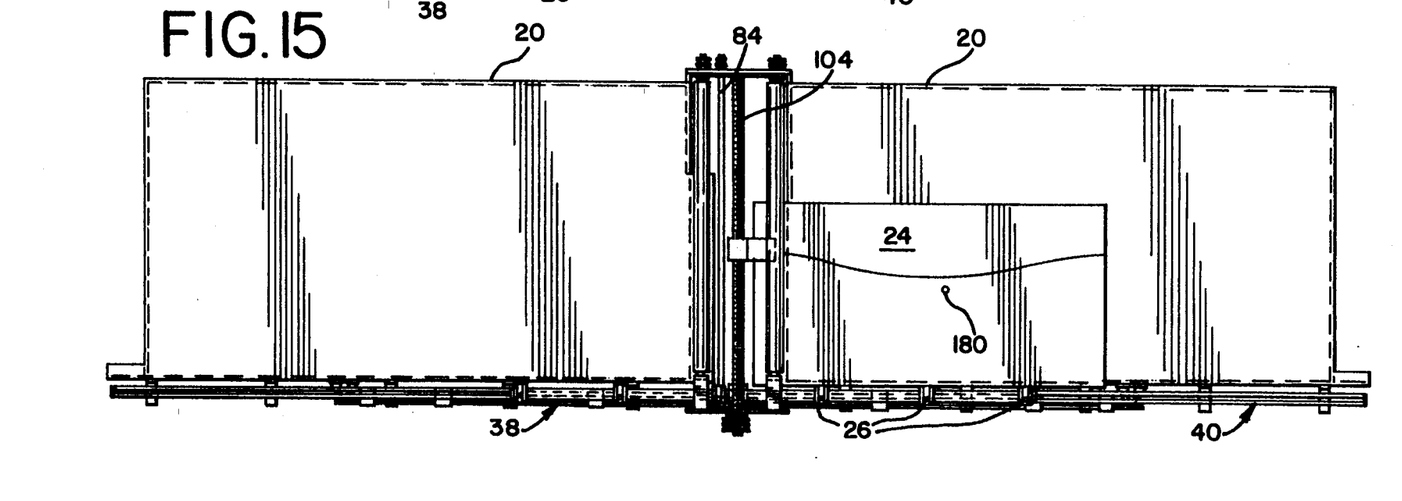
FIG. 15 is a top view of the invention showing the sheet of material after moving in an axial direction for one complete cut.
Figure 16:
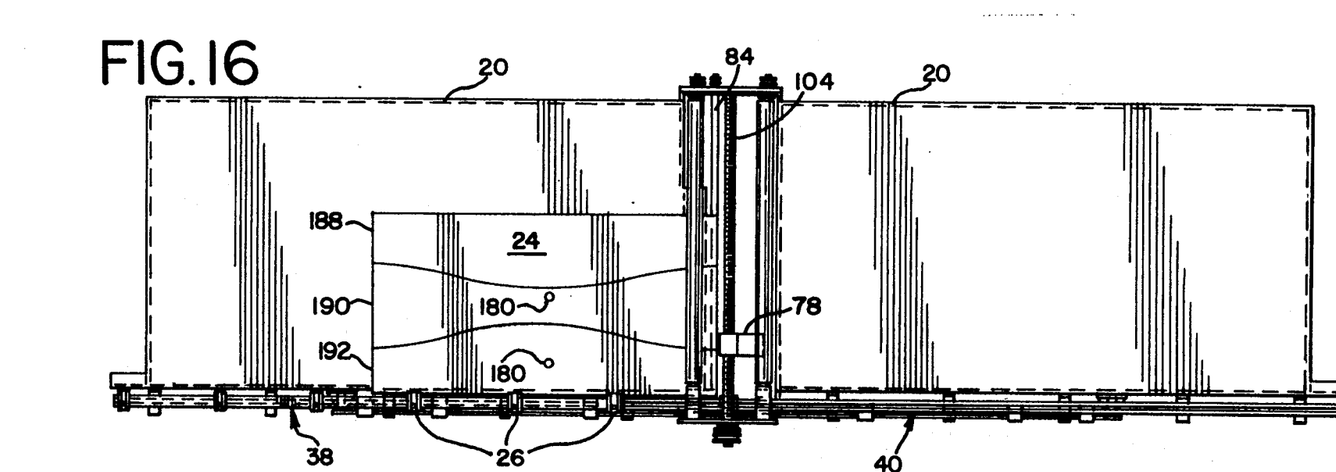
FIG. 16 is a top view of the invention showing the sheet of material after moving in an opposite direction for a second complete cut.

In FIG. 14, the sheet 24 is shown just prior to contact with the cutting head knives 154 and 156. When the sheet 24 is halfway past the cutting knives 154 and 156, a first dimple 180 is made in the sheet 24 by the punch 78 in accordance with the foregoing description. FIG. 15 shows the clamping bar 38 and sheet 24 after a first sine wave cut has been completed. At this point, the cutting head assembly 78 is moved laterally and rotated 180° to a new begin-cut position (shown in broken lines in FIG. 15). The clamping bar 38 and sheet 24 are then moved in an opposite longitudinal direction toward the cutting head assembly 178. At the same time, the cutting head assembly 78 is rotated and moved laterally at a rate corresponding to a sine wave cut. FIG. 16 shows the sheet 24 after a second dimple 180 and sine wave cut have been completed.

Figure 19:
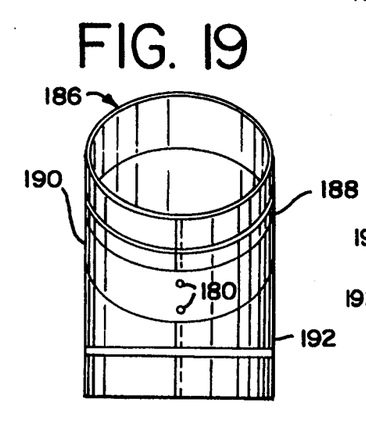
FIG. 19 is a rear view of the elbow in FIG. 17.

In this particular example, the sheet 24 is cut into three segments 188, 190 and 192. The ends of the segments are joined together to create a seam, and the resulting tubes are assembled together into an elbow 186 as shown in FIGS. 17–19. The seam of segment 190 is on the outer side of elbow 186 (FIG. 17), and the seams of segments 188 and 192 are on the underside of elbow 186. In order to ensure that the seams of segments 188, 190 and 192 are properly aligned, the segments are assembled so that the dimples 180 on segment 190 are aligned with the seams of segments 188 and 192.

It will be appreciated that sheets of various sizes can be cut into a desired number of segments to produce an elbow with a desired diameter and bend radius. In addition, the dimples can be placed on the wide part of a segment rather than the narrow part.

Thus, an apparatus and method for cutting sheet metal into a plurality of segments for assembly into an elbow for furnace pipe or the like is provided. The present invention produces a clean, precise cut and is less expensive than conventional cutters which require sophisticated systems for guiding and supporting several cutting heads.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

I claim:

1. An apparatus for cutting a sheet of material into a plurality of segments having curved edges, comprising:
   a frame having a support member for supporting a sheet of material thereon;
   a movable clamping means for securing the sheet and moving said sheet therewith in an axial direction; and
   a cutting head assembly having a rotatable knife adapted to cut the sheet as the sheet moves in an axial direction past the knife, said cutting head assembly being rotatable about a vertical axis and movable in a lateral direction perpendicular to the axial motion of the sheet.

2. The apparatus of claim 1 wherein the cutting head assembly includes a cutter head with an upper portion above the plane of the sheet and a lower portion below the plane of the sheet.

3. The apparatus of claim 2 further comprising an upper moving mechanism attached to the upper portion of the cutter head and a lower moving mechanism attached to the lower portion of the cutter head, said upper and lower moving mechanisms cooperating to support and move the cutting head assembly in said lateral axial direction.

4. The apparatus of claim 2 wherein said knife is attached to the upper portion of the cutter head and further comprising a lower knife attached to the lower portion of the cutter head.

5. The apparatus of claim 1 further comprising a screw positioned horizontally across the frame and a nut threadably mounted to the screw and attached to the cutting head assembly, whereby rotation of the screw in one direction moves the nut in one axial direction, and rotation of the screw in an opposite direction moves the nut in an opposite axial direction.

6. The apparatus of claim 5 wherein said screw and nut are positioned above the plane of the sheet, and further comprising a second screw positioned horizontally across the frame and below the plane of the sheet, and a second nut threadably mounted to the second screw and attached to a lower portion of the cutting head assembly.

7. The apparatus of claim 1 further comprising a controller adapted to send a signal for controlling movement of said clamping means and cutting head assembly at a rate and a distance to produce a curved cutting line.

8. The apparatus of claim 1 wherein the clamping means secures one edge portion of the sheet whereby sheets of various sizes can be securely held and moved by the clamping means, and wherein the opposite edge portion of the sheet is free to be removed after a continuous cutting line is produced over the length of the sheet.

9. The apparatus of claim 1 wherein the clamping means is adapted to move the sheet back and forth past the cutting head assembly, each pass of the sheet producing a single continuous curved cutting line over the entire length of the sheet.

10. The apparatus of claim 1 further comprising a device for punching a dimple in the longitudinal center of the sheet when half of the sheet has moved past the cutting head assembly to allow ready identification of the centerline of separate segments when assembled into an elbow joint.

11. The apparatus of claim 1 wherein the clamping device is adapted to move the sheet in said axial direction to produce a first continuous curved cutting line and return the sheet in the opposite direction to produce a second curved cutting line.

12. The apparatus of claim 11 wherein the cutting head assembly is laterally movable back and forth at a first station while the sheet is moved in said axial direction by the clamping device to produce the first cutting line in the sheet, and further laterally movable a distance from the first cutting line to a second station where the cutting head assembly is in position to again move laterally back and forth while the sheet is moved in the opposite direction to produce the second continuous curved cutting line, said cutting head assembly moving laterally to the second station after the first cutting line is completed.

13. The apparatus of claim 1 wherein the knife is passively rotatable in response to movement of the sheet.

14. The apparatus of claim 1 wherein the cutting head is actively rotated by a moving mechanism.

15. The apparatus of claim 1 wherein the axis of rotation of the cutting head assembly passes approximately through a point defined by the intersection of the knife with the sheet.

16. The apparatus of claim 2 wherein the cutting head has a substantially horizontal middle portion configured to be engaged by the sheet such that one portion of the sheet is directed over said middle portion and another portion of the sheet is directed below said middle portion as the sheet passes by the cutting head assembly.

17. An apparatus for cutting a sheet of material into a plurality of segments having curved edges, comprising:
a frame having a horizontal support member for slidably receiving a sheet of material thereon;
a clamping device adapted to secure an edge portion of the sheet and move with said sheet in an axial direction;
a first mechanism for moving the clamping device and sheet back and forth in said axial direction;
a cutting head assembly having a pair of passively rotatable knives which cooperate to cut the sheet as the sheet moves in an axial direction past the knives, one of said knives being positioned above the plane of the sheet and another of said knives being positioned below the plane of the sheet, said cutting head assembly being rotatable about a vertical axis and movable in a lateral direction perpendicular to the axial motion of the sheet;
a second mechanism for moving the cutting head assembly in said lateral direction, said second mechanism comprising an upper moving mechanism attached to an upper portion of the cutting head assembly and a lower moving mechanism attached to a lower portion of the cutting head assembly, said upper and lower moving mechanisms cooperating to support and move the cutting head assembly in said lateral axial direction;
a third mechanism for rotating the cutting head assembly, said third mechanism being movable with the cutting head assembly as it moves in said lateral direction; and
a controller for sending a signal to the first, second, and third moving mechanisms to move the corresponding components at a rate and distance which produces a continuous curved cutting line.

18. The apparatus of claim 17 wherein the second moving mechanism comprises a screw positioned horizontally across the frame above and below the plane of the sheet and a nut threadably mounted to each screw, said nuts being attached to the cutting head assembly such that simultaneous rotation of the screws in one direction moves the nuts in one axial direction, and simultaneous rotation of the screws in an opposite direction moves the nuts in an opposite axial direction.

19. The apparatus of claim 17 wherein the controller is adapted to send a signal to said moving mechanisms which causes said mechanisms to move their connected components at a rate and a distance to produce a cutting line defined by a sine wave.

20. The apparatus of claim 17 wherein the clamping device comprises a pneumatic cylinder which forces a clamping member into contact with the sheet.

21. The apparatus of claim 17 wherein the axis of each knife is approximately 30 degrees from a horizontal axis.

22. The apparatus of claim 17 further comprising a device for punching a dimple in the longitudinal center of the sheet when half of the sheet has moved past the cutting head assembly to allow ready identification of the centerline of separate segments when assembled into an elbow joint.

23. An apparatus for cutting a sheet of material into a plurality of segments having curved edges, comprising:
a frame having a horizontal support member for slidably receiving a sheet of material thereon;
a clamping device adapted to secure an edge portion of the sheet and move with said sheet in an axial direction;
a mechanism for moving the clamping device and sheet back and forth in said axial direction;
a cutting head assembly having a pair of passively rotatable knives which cooperate to cut the sheet as the sheet moves in an axial direction past the knives, one of said knives being positioned above the plane of the sheet and another of said knives being positioned below the plane of the sheet, said cutting head assembly being rotatable about a vertical axis and movable in a lateral direction perpendicular to the axial motion of the sheet;
an upper screw positioned horizontally across the frame above the plane of the sheet;
an upper nut attached to the cutting head assembly and threadably mounted to the upper screw,
a lower screw positioned horizontally across the frame below the frame of the sheet;
a lower nut attached to the cutting head assembly and threadably mounted to the lower screw;
a mechanism for simultaneously rotating said screws such that rotation of the screws in one direction moves the nuts in one axial direction, and rotation of the screws in an opposite direction moves the nuts in an opposite axial direction, thereby moving said cutting head assembly in a lateral direction;

a mechanism for rotating the cutting head assembly, said mechanism being movable with the cutting head assembly as it moves in said lateral direction; and a controller for sending a signal to the first, second, and third moving mechanisms to move the corresponding components at a rate and distance which produces a continuous curved cutting line.

24. The apparatus of claim 23 further comprising a plurality of rollers for guiding the sheet metal into and out of contact with the cutting head assembly.

25. An apparatus for cutting a sheet of material into a plurality of segments having curved edges, comprising:

a frame having a support member for supporting a sheet of material thereon;

a movable clamping device adapted to secure only one edge portion of the sheet and move said sheet therewith in a first axial direction and a second opposite axial direction; and a cutting head assembly having a passively rotatable knife adapted to cut the sheet as the sheet moves past the knife, said cutting head assembly being rotatable about a vertical axis and laterally movable back and forth in a direction perpendicular to the axial motion of the sheet, said cutting head assembly being laterally movable back and forth at a first station while the sheet is moved in the first axial direction to produce a first continuous curved cutting line in the sheet, and further laterally movable a distance from the first cutting line to a second station where the cutting head assembly is in position to again move laterally back and forth while the sheet is moved in the second axial direction to produce the second continuous curved cutting line, said cutting head assembly moving laterally to the second station after the first cutting line is completed; and a mechanism for rotating the cutting head assembly, said mechanism being movable with the cutting head assembly as it moves laterally.

* * * * *